(12) United States Patent
Rueb

(10) Patent No.: US 10,330,467 B2
(45) Date of Patent: Jun. 25, 2019

(54) PRECISION LOCATING ROTARY STAGE

(71) Applicant: Virtek Vision International ULC, Waterloo (CA)

(72) Inventor: Kurt D. Rueb, Kitchener (CA)

(73) Assignee: Virtek Vision International ULC (CA)

( * ) Notice: Subject to any disclaimer, the term of this patent is extended or adjusted under 35 U.S.C. 154(b) by 0 days.

(21) Appl. No.: 15/609,778

(22) Filed: May 31, 2017

(65) Prior Publication Data

US 2017/0350694 A1 Dec. 7, 2017

Related U.S. Application Data

(60) Provisional application No. 62/343,910, filed on Jun. 1, 2016.

(51) Int. Cl.
| | |
|---|---|
| *F16M 11/00* | (2006.01) |
| *G01B 11/26* | (2006.01) |
| *F16M 11/12* | (2006.01) |
| *F16M 11/18* | (2006.01) |
| *F16M 11/22* | (2006.01) |

(52) U.S. Cl.
CPC .......... *G01B 11/26* (2013.01); *F16M 11/126* (2013.01); *F16M 11/18* (2013.01); *F16M 11/22* (2013.01)

(58) Field of Classification Search
CPC ............... G01D 5/00; G01D 5/02; G01D 5/10
USPC ................. 248/917, 919, 131, 125.7, 187.1
See application file for complete search history.

(56) References Cited

U.S. PATENT DOCUMENTS

| | | | | |
|---|---|---|---|---|
| 3,936,026 | A * | 2/1976 | Hampel | F16M 11/08 248/349.1 |
| 7,975,969 | B2 * | 7/2011 | Jan | F16M 11/08 108/103 |
| 8,300,391 | B2 * | 10/2012 | Hu | G06F 1/1681 248/917 |
| 9,952,496 | B2 * | 4/2018 | Okumura | G03B 17/561 |
| 2003/0002198 | A1 | 1/2003 | Subrahamanyan et al. | |
| 2005/0183695 | A1 * | 8/2005 | Keefover | F02D 9/1065 123/399 |
| 2007/0023598 | A1 * | 2/2007 | Kim | F16M 11/10 248/276.1 |
| 2007/0272840 | A1 | 11/2007 | Musha et al. | |
| 2009/0058349 | A1 | 3/2009 | Tsai et al. | |
| 2010/0052663 | A1 | 3/2010 | Mehnert et al. | |
| 2010/0290017 | A1 | 11/2010 | Mason | |

(Continued)

*Primary Examiner* — Steven M Marsh
(74) *Attorney, Agent, or Firm* — Miller Canfield

(57) ABSTRACT

A rotary stage assembly includes a platform and a rotary drive defining an axis of rotation. The platform is mounted on a spindle for receiving rotary movement from the rotary drive. A cylindrical wall is attached to the platform receiving rotary movement from the rotary drive and is coaxial with the axis of rotation defined by the rotary drive. The cylindrical wall defines an inner surface including reference patterns. An imaging assembly images the reference patterns on the inner surface of the cylindrical wall. The imaging assembly detects angular orientation and tilt of the platform from an axis of rotation of the platform from imaging the reference patterns on the inner surface of the cylindrical wall. A controller calculates angular orientation and tilt of the platform from the location of said reference patterns signaled from the imaging assembly.

11 Claims, 2 Drawing Sheets

(56) References Cited

U.S. PATENT DOCUMENTS

2013/0088126 A1  4/2013  Muraoka et al.
2017/0115136 A1  4/2017  Kurte et al.

* cited by examiner

PRECISION LOCATING ROTARY STAGE

PRIOR APPLICATIONS

The present application claims priority to U.S. Provisional Patent Application No. 62/343,910 filed on Jun. 1, 2016, the contents of which are included herein by reference.

TECHNICAL FIELD

The present invention relates generally toward a rotary stage for supporting a payload. More specifically, the present invention relates to a simplified rotary stage providing precise identification of angular orientation and tilt of the payload.

BACKGROUND

Rotary stages and platforms have been used to provide a wider angle of view to, for example, imaging devices including cameras for some time. Cameras or other technical devices are installed as part of a payload on a rotary stage or platform. It is generally desirable to identify the angle of rotation of which the technical device is oriented. Efforts to identify the angular orientation require the use of complex encoders in combination with expensive, high accuracy rotary drives. It has been customary to signal the rotary drive in intended angular orientation to rotate the stage to the angular orientation without performing any remedial measurement to determine the angular orientation of the stage or platform. To achieve some degree of accuracy, the drive typically includes a stepper motor that is particularly costly when working in combination with an encoder to direct the motor to the desired orientation. Achieving a high degree of accuracy has still proven elusive, particularly at a reasonable cost. To achieve a high degree of accuracy, the prior art rotary drives are known to dither or oscillate around a target angular orientation while attempting to establish desired accuracy. Even high cost rotary drives can only achieve a degree of accuracy that makes it difficult to use the payload for high precision operations such as, for example, template laser projection, photographic measurement, and inspection systems performed on large objects, such as, for example, an airplane fuselage that requires a wide angle of view not achievable by a stationary system.

In addition, rotary platforms or stages have not included provisions to determine tilt of a platform or stage from away from a vertical axis or axis of rotation. Therefore, the platforms or stages must be secured in highly accurate horizontal orientation. Alternatively, tilt is simply ignored reducing accuracy of the imaging device located on the platform or stage.

Alternatively, to perform these functions on a large object, the payload is moved a long distance from the object further resulting in reduction in accuracy. A low cost system to overcome these problems has not yet been found. Therefore, it would be desirable to provide a rotary stage or platform capable of working in unison with the highly technical payload such as, for example, a laser projector, the photogrammetric measurement system, or an inspection system that is low cost, and simple to maintain that is capable of providing a high degree of accuracy.

SUMMARY

A rotary stage assembly includes a platform and a rotary drive. The rotary drive defines an axis of rotation including a spindle. The platform is mounted on the spindle for receiving rotary movement from the rotary drive. A cylindrical wall is fixably attached to the platform receiving rotary movement with the platform from the rotary drive. The cylindrical wall is co-axial with the axis of rotation defined by the rotary drive. The cylindrical wall defines an inner surface including reference patterns. An imaging assembly images the reference patterns disposed on the inner surface of the cylindrical wall. The imaging assembly detects angular orientation and tilt of the platform an axis of rotation of the platform from imaging the reference patterns disposed upon the inner surface of the cylindrical wall. A controller calculates angular orientation and tilt of the platform from the axis of rotation of the platform from a location of the reference patterns signaled from the imaging assembly to the controller.

The rotary stage assembly of the present application works in an opposite manner of high cost rotary stage assembly of the prior art. Unlike prior art rotary stage assemblies with highly expensive and technical rotary drives that are directed by an encoder to move to a predetermined location, the low cost rotary drive of the present invention merely moves to a proximate a desired angular orientation. The imaging assembly identifies precise angular orientation of the platform by imaging the reference patterns disposed on an inner surface of the cylindrical wall after the platform has been moved to a proximate angular orientation. The angular orientation need not be precise as required of prior art devices because the imaging assembly identifies the precise location after the platform has been rotated to an approximate angular orientation. When the precise location of the platform is identified, the controller signals the payload to make responsive adjustments to achieve a high degree of projection or imaging accuracy.

In addition, prior art rotary stage assemblies are incapable of determining the tilt of the platform away from a an axis of rotation as defined by a spindle of a rotary drive. Many spindles of rotary drives experience wobble from low cost bearings or other technical inaccuracies, such as, for example a spindle that is not perfectly straight. The imaging assembly of the present invention is capable of identifying an amount of tilt from an axis of rotation resulting from any of these, and other technical inaccuracies of the rotary drive. By measuring an accurate orientation of the platform the reliance on high cost, precision mechanical drives is eliminated. After calibration, the rotary stage assembly of the present invention is capable of directing the payload including laser projector, photogrammetric measurement system, or inspection system in a highly precise manner achieving tolerances of 0.5 millimeters or less even when the payload has not been moved in a precise manner.

BRIEF DESCRIPTION OF THE DRAWINGS

Other advantages of the present invention will be readily appreciated, as the same becomes better understood by reference to the following detailed description when considered in connection with the accompanying drawings, wherein.

DETAILED DESCRIPTION

Figure 1:
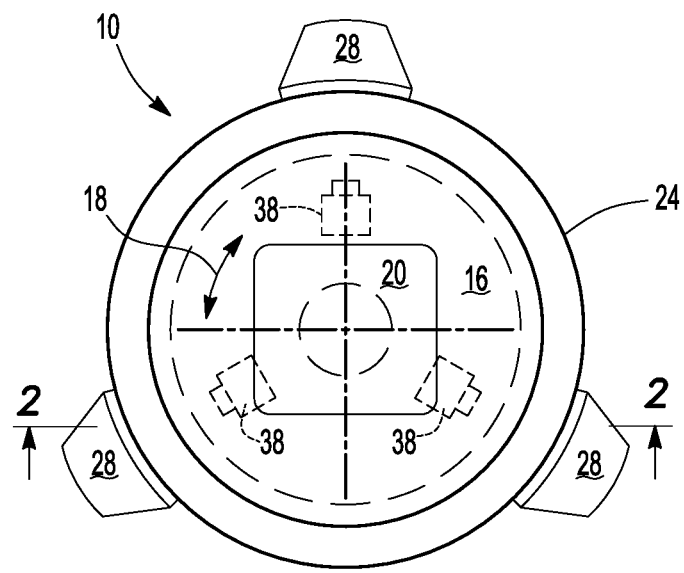
FIG. 1 shows a plan view of a rotary stage assembly of the present invention.
Figure 2:
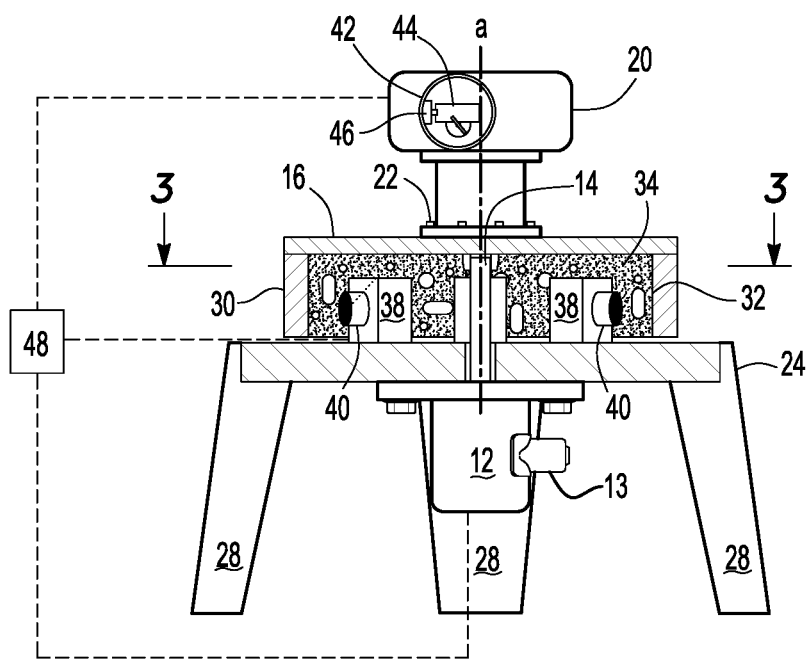
FIG. 2 shows a side schematic view of the rotary stage assembly of the present invention though line 2-2 of FIG. 1.
Figure 3:
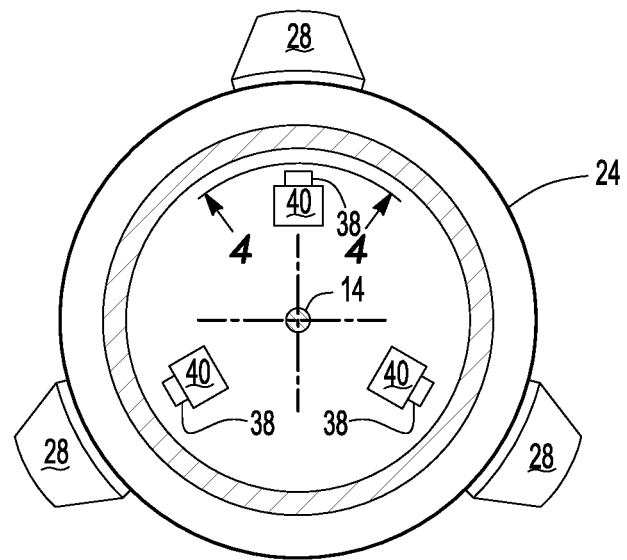
FIG. 3 shows a top sectional view of the imaging assembly and frame through line 3-3 of FIG. 2.
Figure 4:
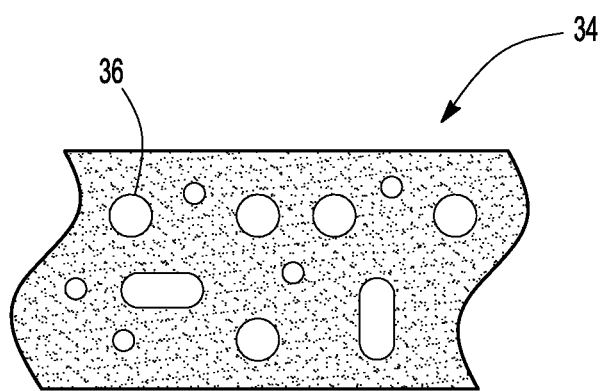
FIG. 4 shows an image of the reference patter disposed upon an inner surface of a cylindrical wall.

Referring to FIGS. 1 and 2, a rotary stage assembly is generally shown at 10. A rotary drive 12 transfers an axis of rotation with a spindle 14. The rotary drive 12 takes the form of a servo motor or any low cost electric motor capable of transferring rotational movement to the spindle 14. The rotary drive 12 need not translate rotational movement to the spindle 14 in a highly accurate manner. The rotary drive 12 need merely transfer rotational movement proximate a desired angular orientation as will be explained further herein below. The rotary drive 12 is contemplated to be any drive that is capable of transferring rotational movement to an approximate angular orientation and then stop in a fixed position. In one embodiment, the rotary drive 12 is a direct drive motor with a high gear ratio such that the position of the drive is disposed in a fixed position when not operating. In another embodiment, the rotary drive 12 takes the form of a servo-motor with a brake 13 that will stop and hold the rotary drive 12 in a fixed position when the rotary drive 12 is not operating. The brake 13 prevents dithering or oscillation around a desired stopping angular orientation as is typical of even high cost drives that make use of complex encoders. In a still further embodiment, the rotary drive 12 is depowered or deactivated once the rotary drive 12 has reached an approximate, desired angular orientation. The brake 13 can take any form of a device that will stop or secure the rotary drive 12 at the desired stopping angular orientation. As used within the present application, angular orientation is relative to the axis a of rotation of the rotary drive 12

A platform 16, in one embodiment, is supported on the spindle 14 and receives rotational movement around axis a as shown by arrow 18 (FIG. 2) from the rotary drive 12. As used herein, the spindle 14 includes any element that transfers rotational movement to the platform 16, whether or not including substantially vertical orientation. A payload 20 is secured to the platform 16 by a plurality of fasteners 22 so that the payload 20 is fixedly secured relative to the platform 16. In one embodiment, at least 3 fasteners 22 are received by pre-existing apertures (not shown) disposed in the platform 16. However, it should be understood that additional fasteners 22 may be used to secure the payload 20 to the platform 16.

The rotary drive 12 is secured to a support structure 24. The support structure 24 includes a base 26 supported by legs 28. The legs 28 orient the base substantially horizontally. However, the base 26 need not be precisely horizontal to achieve a high degree of accuracy as will be explained further herein below.

A cylindrical wall 30 is located beneath the platform 16 proximate the periphery of the platform 16. The cylindrical wall 30 defines an inner surface 32 onto which a reference pattern 34 is disposed. The reference pattern 34, in one embodiment, is an arbitrary pattern. Any pattern providing distinguishing and unique characteristics in both the axial direction and an angular direction around the axis a is suitable. In one embodiment, a dark anodized coating having circular portions 36 removed to expose the inner surface 32 is believed suitable. Different size and shaped oval portions 36 offer identifiable features that are useful in determining an orientation of the platform 16. However, other distinguishing elements of a reference pattern 34, including decals, arbitrary lines, or any pattern that is distinguishable and presents uniqueness at different locations will suffice.

An imaging assembly 38 is mounted on the base 26 beneath the platform 16. The imaging assembly 38 includes a plurality of cameras 40 that generate an image of the reference pattern 34 disposed upon the inner surface 32 of the cylindrical wall 30. In one embodiment, the imaging assembly 38 includes three cameras 40. However, more or less cameras 40 are included within the scope of this invention. It is believed three or more cameras 40 provide a higher degree of accuracy than one or two cameras and that the number of cameras 40 selected may be based upon a desired level accuracy.

The imaging assembly 38 also identifies an angular orientation of the platform 16 in the direction of arrow 18 by generating an image of the reference pattern 34. The reference pattern 34 provides unique features at different locations of the inner surface 32 of the cylindrical wall 30. Therefore, the imaging assembly 38 is capable of accurately detecting the angular orientation of the platform 16 by imaging unique features defined by the reference patter 34. In addition, the reference pattern provides unique features in the direction of the axis a defined by the spindle 14. Therefore, the imaging assembly 38 also identifies tilt of the platform 16 relative to the axis a of rotation of the spindle 14 by imaging unique features in the axial direction.

As set forth above, a payload 20 is secured to the platform 16. In one embodiment, the payload 20 includes a laser projector 42. As known to those skilled in the art, the laser projector 42 projects a laser beam (not shown), the direction of which is established by mirrors 44 controlled as part of a galvanometer 46. Additionally, lenses (not shown) and other apparatus required to project a laser beam are included within the scope of this invention but not explained further herein. In alternative embodiments, the payload 20 also includes a photogrammetric measurement system and an inspection system or combination of the laser projector 42, photogrammetric measurement system and inspection system. For simplicity, the photogrammetric measurement system and the inspection system are all represented by element number 42. It is within the scope of this invention that the payload 20 includes any device required to either generate a photographic image or project a laser image at a wide angle.

The payload 20, the imaging assembly 38 and the rotary drive 12 are electronically connected to a controller 48. The controller 48 determines a three-dimensional orientation of the platform 16 from images generated by the imaging assembly 38 of the reference pattern 34. Unlike prior art assemblies that require an encoder to direct a high cost motor to move to a specific location, the controller 48 merely signals the rotary drive 12 to rotate to a general or proximate angular orientation not requiring a high degree of precision. Once moved to a proximate angular orientation, the rotary drive 12 may be stopped by the brake 13 and deactivated by the controller 48. As set forth above, any combination of braking or deactivation may be used to hold the rotary drive 12 in a fixed position. Subsequent to deactivating or terminating movement of the rotary drive 12, the controller 48 receives an image generated by the imaging assembly 38 of the reference pattern 34. From the image generated of the reference pattern 34, the controller 48 determines a precise angular orientation and tilt of the platform 16 from the axis of rotation of the platform 16. Once the angular orientation and tilt of the platform 16 is determined by the controller 48, the controller signals the payload 20 the tilt and angular orientation so that the payload 20 can precisely either project a laser image or generate photogrammetric measurement of an object. As set forth above, the accurate method of measuring angular orientation and tilt of the platform 16 eliminates the need for a high accuracy, cost prohibitive motor and encoder combination to move a platform.

The controller 48, in one embodiment, is included with the payload 20. In an alternative embodiment, the controller 48 is affixed to the support structure 24. In a still further embodiment, the controller 48 is disposed at a remote location and is wirelessly connected to the payload 20, the imaging assembly 38 and the rotary drive 12.

To achieve high precision measurement, it is desirable to calibrate the imaging assembly 38 relative to the reference pattern 34 and the payload 20. As such, the assembly 10 is calibrated on a fixture capable of identifying an unique features of the reference pattern 34 relative to the payload 20 at different locations of the reference pattern 34. The accurate location of the reference pattern 34 is stored by the controller and is referenced when performing a high precision measurement of the tilt and angular orientation of the platform 16 and the payload 20. Once calibrated, the payload 20 is capable of projecting a laser image at a wide angle in a precise manner, even up to 0.5 millimeters tolerance. In addition, the payload 20 is capable of performing a photogrammetric measurement or inspection of an object within a similar tolerance as explained above, which was previously not achievable.

Additional accuracy is achieved by including the plurality of cameras 40 in the imaging assembly 38. With a plurality of cameras 40, images are generated of the reference pattern 34 at spaced location. It is believed that generating images at spaced locations enables the imaging assembly 38 to more accurately generate useful data for the controller 48 to calculate both the angular orientation and the tilt relative to the axis a of the platform 16. A further enhancement to the imaging assembly 38 includes a light source 50 to illuminate the reference pattern 34 to allow the cameras 40 to more clearly generate an image of the reference pattern 34.

Once the angular orientation and tilt of the platform 16 is established by the controller 48, the controller 48 determines the proper orientation of the payload to achieve the desired degree of accuracy. When the proper orientation of the payload 20 is determined, the payload 20 is signaled by the controller 48 the make the necessary adjustment to project or scan the object.

The invention has been described in an illustrative manner, and it is to be understood that the terminology that has been used is intended to be in the nature of words of description rather than of limitation. Obviously, many modifications and variations of the present invention are possible in light of the above teachings. It is therefore to be understood that within the specification, the reference numerals are merely for convenience, and are not to be in any way limiting, the invention may be practiced otherwise than is specifically described. The invention can be practiced otherwise than as specifically described within the scope of the appended claims.

What is claimed is:

1. A rotary stage assembly; comprising:
   a platform and a rotary drive defining an axis of rotation with a spindle, said platform being mounted on said spindle for receiving rotary movement from said rotary drive;
   a cylindrical wall fixedly attached to said platform receiving rotary movement with said platform from said rotary drive and being coaxial with said axis of rotation defined by said rotary drive, said cylindrical wall defining an inner surface including reference patterns;
   an imaging assembly for imaging said reference patterns disposed upon said inner surface of said cylindrical wall;
   said imaging assembly being adapted for detecting angular orientation and tilt of said platform from an axis of rotation of said platform by imaging said reference patterns disposed upon said inner surface of said cylindrical wall; and
   a controller for calculating angular orientation and tilt of said platform from said axis of rotation from a location of said reference patterns signaled from said imaging assembly to said controller.

2. The assembly set forth in claim 1, wherein said platform supports a payload apparatus including one of a laser projector, photogrammetric measurement system, or inspection system.

3. The assembly set forth in claim 2, wherein said controller is interconnected with said payload apparatus, said rotary drive and said imaging assembly for determining an axial and angular orientation of said platform and signaling said payload apparatus the axial and angular orientation of said platform.

4. The assembly set forth in claim 1, wherein said imaging assembly includes a plurality of cameras for generating images of said reference pattern at spaced locations.

5. The assembly set forth in claim 4, wherein said imaging assembly includes at least three cameras.

6. The assembly set forth in claim 1, wherein said imaging assembly includes an illumination device for illuminating said reference pattern.

7. The assembly set forth in claim 1, wherein said rotary drive and said imaging assembly are affixed to a support structure.

8. The assembly set forth in claim 1, Wherein said reference pattern includes random markings.

9. The assembly set forth in claim 1, wherein said reference pattern includes vertical and horizontal identifiers.

10. The assembly set forth in claim 1, wherein said controller determines three dimensional orientation of said platform from images of said reference pattern by said imaging assembly.

11. The assembly set forth in claim 1, wherein said rotary drive includes a brake for stopping or holding said rotary drive in a fixed angular orientation.

* * * * *